ADAM A. JORGENSEN
ERNEST O. LEE, Jr.
GUENTHER F. NEUMEIER
GERHARD O. K. SCHNEIDER
INVENTORS

BY Dicke + Craig
ATTORNEYS

Dec. 23, 1969 A. A. JORGENSEN ET AL 3,485,956

PATH-FINDING SYSTEM FOR A NETWORK OF CROSS-POINT SWITCHING MATRICES

Filed Sept. 20, 1966 4 Sheets-Sheet 3

ADAM A. JORGENSEN
ERNEST O. LEE, Jr.
GUENTHER F. NEUMEIER
GERHARD O. K. SCHNEIDER
INVENTORS

BY Dicke & Craig
ATTORNEYS

United States Patent Office 3,485,956

Patented Dec. 23, 1969

3,485,956

PATH-FINDING SYSTEM FOR A NETWORK OF CROSS-POINT SWITCHING MATRICES

Adam A. Jorgensen, Pittsford, Ernest O. Lee, Jr., Fairport, and Guenther F. Neumeier and Gerhard O. K. Schneider, Rochester, N.Y., assignors to Stromberg-Carlson Corporation, Rochester, N.Y., a corporation of Delaware Filed Sept. 20, 1966, Ser. No. 580,785
Int. Cl. H04m 3/22
U.S. Cl. 179—18 20 Claims

ABSTRACT OF THE DISCLOSURE

A path-finding system for a multi-stage crosspoint matrix network is disclosed wherein a magnetic core corresponds to each link between the stages thereof. The sleeve or holding lead for each link is threaded through its corresponding core so that when the link is in use the holding current flowing through the sleeve lead biases the core into one of its binary states. During path-finding the desired input and output are marked in the conventional manner and a voltage pluse is applied successively to each of a plurality of scan points from which the pulse flows through a combination of links and a set of cores associated therewith which represent a unique path through the matrix. The condition of the cores traversed by this pulse indicates the busy-free condition of the associated link in the unique path. Through-connection means are provided.

The present invention relates in general to automatic telephone communication sytems, and more particularly, to a means of establishing a path from a given input to a given output through a matrix of cross point switching devices.

Known arrangements for establishing a path through a complex matrix of cross point switching devices during the process of establishing a communication connection between subscriber line circuits provide for a means separate from the switching matrix for individually testing the busy-free condition of each link of the matrix on an individual basis so as to determine an available path between a marked input and a marked output of the matrix through comparison of the condition of the various links. However, due to this necessity for individually testing each of the many links in the complex arrangement of the matrix, the known testing means necessarily is of very complex configuration requiring complex control circuitry for providing the desired information.

It is therefore an object of the present invention to provide means for establishing an open path from a given input to a given output through a matrix of cross point switching devices which overcomes or otherwise completely avoids all of the difficulties and inherent disadvantages of known arrangements of a similar nature.

It is a further object of the instant invention to provide an arrangement of the type described which is of such simplicity as to permit an incorporation thereof into the switching matrix itself.

It is another object of the instant invention to provide a device of the type described which provides almost complete availability of the circuits included in the switching matrix configuration.

In brief, the control network of the present invention is essentially a map or model of the switching matrix with the operate winding of each cross point device assuming in the control network a position analogous to its contacts in the switching matrix. For each link between the stages of the switching matrix network, a magnetic core is provided in the control network and the sleeve or holding lead for each link is threaded through its corresponding core so that when the link is in use the holding current flowing through the sleeve lead biases the core into one of its binary states and prevents its switching into the other binary state.

When it is desired to establish a path through the matrix, the desired input and output are marked in the conventional manner and a voltage pulse is applied successively to each of a plurality of scan points from which the pulse current flows through a combination of links and a set of cores associated therewith which represent a unique path through the matrix. The condition of the cores traversed by this pulse of current indicates the busy-free condition of the associated link in the unique path, and means are provide, upon detection of a path whose links are all available, for permanently operating the relays associated with this path so as to close the path between the marked input and the marked output.

These and other objects, features and advantages of the present invention will become more apparent from the following detailed description thereof, when taken in conjunction with the accompanying drawings which disclose one embodiment of the present invention, and wherein.

Figure 1:
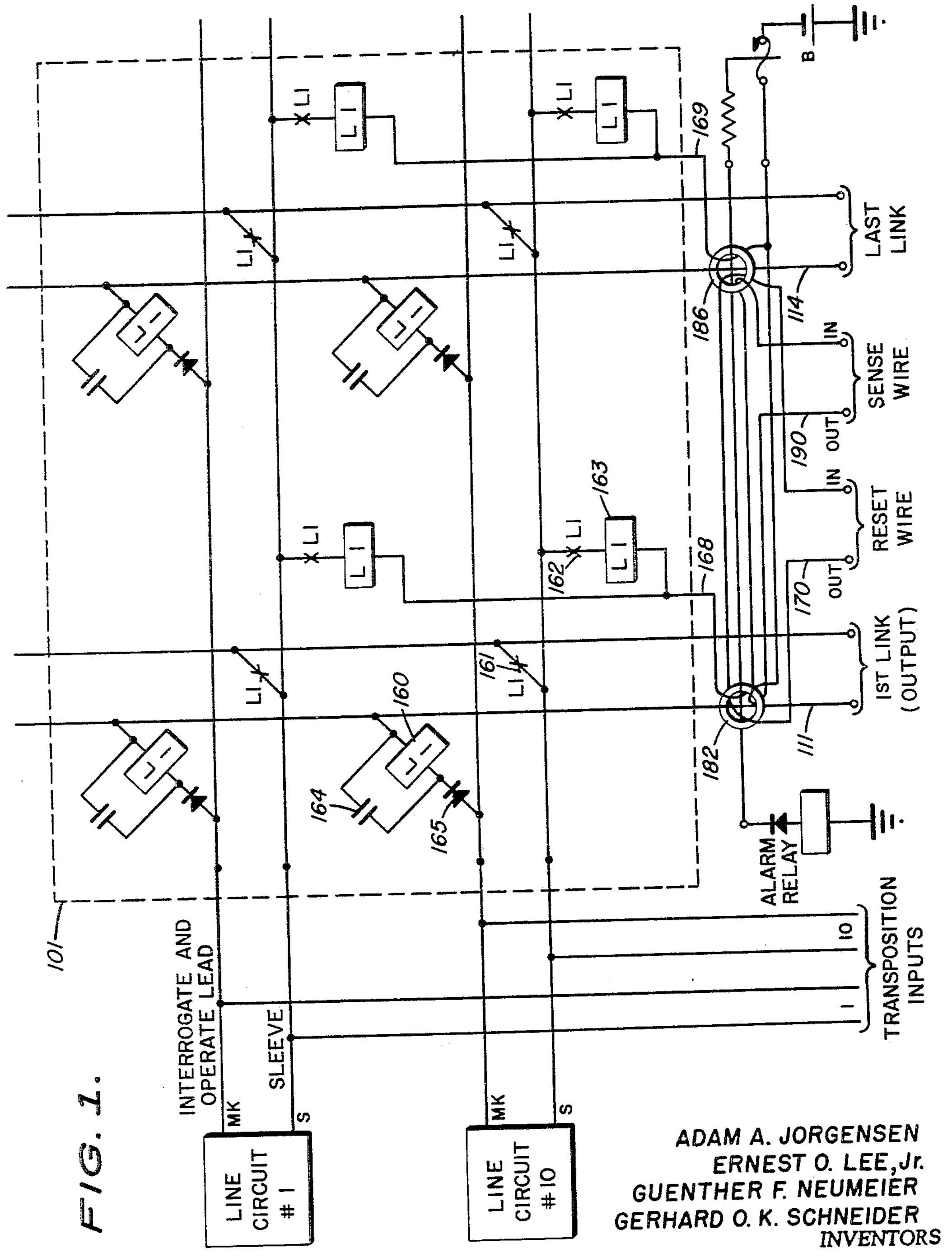
FIGURE 1 is a detail circuit diagram of a portion of an individual matrix of operate windings associated with a sub-multiple of subscriber line circuits.

While a specific switching network configuration has been selected for illustration in the drawings and description herein, it will be clear from the following description of the principles of the present invention that the invention is applicable to different switching arrangements than the one specificaly provided herein. More specifically, the particular number of line circuits and individual matrix groups which are included in the overall switching network and the grading between successive stages in the switching arrangement may be changed in accordance with specific requirements without departing from the spirit and sope of the present invention. The present invention has been designed specifically for use in connection with the common control system disclosed in copending application S.N. 552,283 entitled "Universal Junctor" filed May 23, 1966 in the name of James G. Pearce et al., and assigned to the same assignee with the present aplication. However, this invention may also be used apart from the specific control system disclosed in the aforementioned application, without sacrifice of any of the specific advantages associated therewith.

Looking now to the drawings, wherein like reference numerals have been used to designate corresponding elements in the several views wherever possible, FIGURE 1 illustrates a typical non-blocking cross point switching array for effecting interconnection of one or more subscriber line circuits to respective outputs for application to other matrices or to common control equipment as may be required. Each of the line circuits 1 and 10 are provided in the figure with a sleeve lead S and and a marking or interrogate lead MK. In the well known manner, the sleeve lead of a subscriber line circuit may be interconnected with a particular output from the matrix through operation of the cross point relay associated with this output and connected between the MK lead of the line circuit and an associated output link of the matrix. For example, in connecting the line circuit 10 to the first output link of the matrix, operation of the relay 160 through application of a direct current signal from line 111 through the operate winding of the relay to the MK lead of the line circuit closes the contacts 161 associated with the cross point and also closes contacts 162 associated with a holding circuit for the cross point. The result is interconnection of the sleeve lead S from the line circuit 10 through the cross point 161 in the matrix to the output sleeve lead S. The closing of contacts 162 completes connection from the sleeve lead S to the line circuit 10 through a holding winding 163 of the relay 160 which is in turn connected to a source of potential B. Closing of the contacts 161 and 162 will result in energization of the winding 163 in the holding circuit, which in effect maintains the contacts in the closed condition regardless of the condition of the relay winding 160.

A capacitor 164 is provided in parallel with each winding associated with a cross point of the matrix and provides a low impedance path for the control pulses applied to the operate winding in accordance with the present invention and diodes 165 are provided in series with this operate winding to prevent the control pulses from taking uncontrolled paths through the network. The application of these control pulses, as will be described in greater detail hereinafter, serves to determine the busy-free condition of the various paths through the matrix groups.

In accordance with the present invention there is provided at each output of the switching matrix a core of magnetic material having the typical square hysterisis characteristic, providing distinctive binary "1" and "0" states. The output control leads 111 and 114 in FIGURE 1 are linked through respective magnetic cores 182 and 186 to the cross points of the matrix where they are connected through the operate winding to the respective subscriber line circuits 1 through 10. The holding circuits 168 and 169 associated respectively with the first and last output links of the matrix illustrated in FIGURE 1 are threaded through respective cores 182 and 186 prior to connection to the battery B. In addition, a reset winding 170 is threaded through each of the cores associated with the matrix and serves to switch these cores to their reset or "0" state upon application of the proper polarity signal thereto. A sense winding 190 is also threaded through each of the cores associated with the matrix and serves as a means for detecting the switching of any one of the cores from one of its binary states to the other.

The operation of the arrangement illustrated in FIGURE 1 is based upon the resetting and setting, respectively, of the magnetic cores 182 and 186 in accordance with the busy-free condition of the particular output link of the matrix associated therewith. Due to the linking of the holding lead for each output link of the matrix with the associated magnetic core, a busy condition of the output link will switch the magnetic core to its reset or binary "0" condition, and will prevent its switching into the set or binary "1" state. Thus, in the case of the previous example wherein interconnection was made between line circuit 10 and the first output link of the matrix through application of a direct current control signal to the line 111, operation of the relay 160 and holding winding 163 will switch the core 182 to its binary "0" state and prevent further switching of the core as long as this circuit is busy. If it is desired to establish a free path through the matrix, a pulse is applied to the reset winding 170 which is threaded through all of the cores associated with the matrix in the case of the illustrated example cores 182 and 186 which causes all of the cores to be set to the binary "1" state except those associated with the links which are in use. If it is assumed as indicated above that the line circuit 10 is connected to the first output link and is busy, core 182 will not be switched and core 186 will be switched to the binary "1" state.

At this point, the busy-free condition of each of the output links of the matrix can be determined through application in a successive manner of an interrogate voltage pulse to the control output leads 111 and 114 from the matrix. For example, if a path is sought to the line circuit 1 through the switching matrix an interrogate pulse will be applied first to control lead 111 and then to control lead 114. The pulse applied to control lead 111 will not switch the core 182 since switching of the core is prevented by the busy condition of the holding winding 168 associated with the first output link of the matrix. However, if the last output link is not busy at the time, the core 186 will have been switched to its binary "1" state through application of the reset pulse to winding 170 and subsequent application of the interrogate pulse to the control lead 114 will switch the core back to its reset state or binary "0" state inducing an output pulse in the sense wire 190 that a free path has been found through the matrix to the desired line circuit, which path is associated with the last output link of the matrix.

As will be described in greater detail hereinafter, the interrogate pulses which are applied to the control leads of the matrix to determine the busy-free condition of each output link thereof are preferably of such short duration as to pass the operate windings of the relay at the associated cross point without actually operating the relay to close the cross points. However, when a free path is found through to the desired line circuit, as determined by detection of an output pulse in the sense wire 190, suitable control arrangements to be described hereinafter apply to the associated output link a control signal of sufficient duration to actuate the contacts at the cross point and in the holding circuit to thereby establish a path from an output link of the matrix through to the line circuit.

Figure 2:
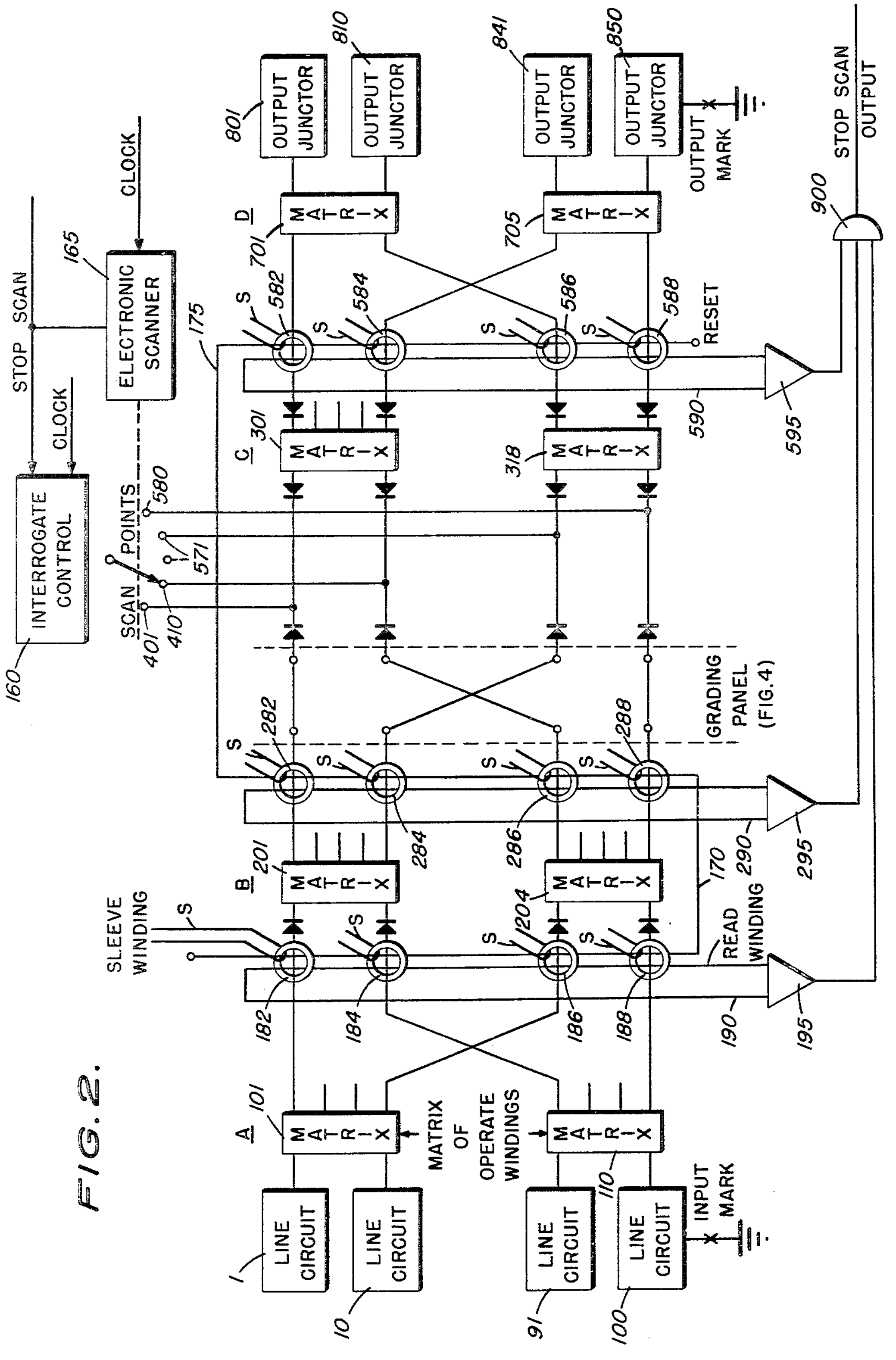
FIGURE 2 is a schematic diagram of a portion of a switching network including the network control of the present invention.

As is well known, the typical switching network associated with electronic telephone equipment consists of a plurality of switching devices such as illustrated in FIG. 1, capable of providing interconnection over a multiplicity of paths between a fixed number of line circuits and the supervisory common control equipment. FIGURE 2 illustrates a simplified network of switching matrices which illustrates the manner in which the principles set forth in connection with FIG. 1 are applied to a network of this type to establish a unique path from a marked input to a marked output thereof.

The network is provided with four line circuits 1, 10, 91 and 100 connected through a network of cross point switching groups of the type illustrated in FIGURE 1 forming a plurality of stages A, B, C and D leading to four output junctor circuits 801, 810, 841 and 850. The output junctors are passive circuit elements which facilitate the monitoring and interconnection of subscriber line circuits under control of common supervisory equipment, and may take the form of the universal junctor circuit disclosed in the aforesaid copending application of James G. Pearce et al. On the other hand, the output of the switching network may also be connected to other telephone exchange equipment since the junctor circuit is not a required element of the present invention.

In well-known matrix switching networks, each of the stages thereof normally include a plurality of individual matrix cross point switching groups, such as the group 101 illustrated in FIG. 1; however, only two such groups are illustrated in the figure in connection with each of the stages A, B, C and D so as to provide a simplified network in association with the elements of the present invention, thereby facilitating the description thereof. A more detailed illustration is provided in FIGURE 3, which will be described hereinafter.

The line circuits 1 and 10 are connected to matrix group 101 and line circuits 91 and 100 are connected to the matrix group 110 in stage A of the network. Select outputs from the matrix groups 101 and 110 are linked through respective core elements 201 and 204 in stage B of the network. In a like manner, select outputs of the matrix groups 201 and 204 are in turn linked to corresponding inputs of matrix groups 301 and 318 in stage C of the network, with each link between the matrix groups being threaded through a respective magnetic core 282, 284, 286 and 288. There is also provided between the outputs of matrix groups 201 and 204 and the input of groups 301 and 318 a grading panel for providing multiple interconnection between the respective outputs and inputs in a predetermined manner, which will be described and illustrated further in connection with FIGURE 4. Select outputs of matrix groups 301 and 318 are linked to matrix groups 701 and 705 in stage D of the network with each of the links being threaded through a respective magnetic core 582, 584, 586 and 588. The outputs from matrix groups 701 and 705 are each connected to a respective output junctor 801, 810, 841 and 850.

A read winding 190 is threaded through each of the cores 182, 184, 186 and 188 associated with the links between stages A and B of the network to detect switching of the cores and each of these cores also carries an individual sleeve winding S associated with a particular cross point of a matrix group in stage A. In a like manner, read windings 290 and 590 are threaded through the cores associated with the links between stages B and C and stages C and D, respectively, and each of these cores is also provided with an individual sleeve winding S. A single reset winding 170 is threaded through all of the cores associated with the links between each of the stages of the network to reset idle cores in preparation for a scanning thereof.

For purposes of interrogating the network to determine on open path therethrough between a marked line circuit and a marked output junctor, a scan point 401, 410, 571 and 580 is associated, respectively, with each of the inputs of the matrix groups 301 and 318 in the stage C of the network. To these scan points an interrogate control 160 is connected on a step by step basis by electronic scanner 165. The interrogate control 160 provides a negative going output pulse which is applied to each of the scan points in succession under control of the electronic scanner 165, regulated by suitable clock pulses applied thereto. These negative going pulses are applied in succession to each of the links between stage B and stage C of the network where they are sent in both directions through the network to seek an open path between the marked line circuit and the marked output junctor.

It will be noted from FIG. 2 that from each scan point at the input to the matrix group of stage C of the network, only one path through each of the stages of the network is available to a given marked line circuit and a given marked output junctor. For example, from the scan point 401 a path exists toward line circuit 100 through the core 282 to matrix group 201, from matrix group 201 through core 184 to matrix group 110, and from matrix group 110 to the line circuit 100. No other path from the scan point 401 will reach line circuit 100. In a like manner, a unique path exists from scan point 401 to the output junctor 850. This path extends via the link to matrix group 301 from the scan point, from matrix group 301 through magnetic core 584 to matrix group 705, and through matrix group 705 to the output junctor 850. Once again, no other path exists from scan point 401 to the output junctor 850. In a similar manner, a unique path may be traced from each of the scan points in one direction toward a marked line circuit and in the other direction toward a marked output junctor, and these unique paths in combination include all of the links in the network. The value of this unique path arrangement will become even more apparent from the description provided hereinafter with respect to the arrangement of FIGURE 3.

As a result of the unique path arrangement provided in accordance with the present invention, a scanning or application of an interrogate pulse to each of the scan points in sequence serves to apply the interrogate pulse to each of the unique paths which make up the matrix network so that if one or more open paths from a marked line circuit to a marked output junctor exist in the network, the interrogate pulse which is applied to the scan point associated with any one of these unique paths will pass through each link of the network and each matrix device along the path both to the line circuit and to the output junctor. Thus, a simple detection of each of the links upon application of an interrogate pulse to the scan point to determine that in fact the interrogate pulse has been permitted to pass each link at each stage of the network in both directions to the line circuit and the output junctor provides an indication that the path interrogated is an open path available for transmission of information.

The means provided in accordance with the present invention for detecting the passage of the interrogate pulse through the various links and stages of the network is in the form of the magnetic cores provided on each link between the stages of the network. All of the cores associated with each group of links between adjacent stages are provided with a common read winding which will detect the passage of an interrogate pulse through that stage of the network. Coincident receipt of an output pulse from the read winding associated with each of the stages of the network will indicate that the interrogate pulse has in fact passed from the scan point both to the marked line circuit and the marked output junctor through all of these stages even though the actual links traversed are unknown. However, as will become clearer hereinafter, it is unnecessary to determine the links which comprise the free path if the scan point associated therewith is remembered.

Looking now to the operation of the invention as illustrated in FIGURE 2, when an originating or terminating call is to be switched through the matrix network, one point on each end of the network is marked with ground in the known manner by conventional supervisory control equipment in the exchange. A reset pulse is then applied to the reset winding 170, which is threaded through all of the cores in the control network. This reset pulse causes all of the cores to bet set to the binary "1" state except those associated with links which are presently in use. In this regard, it should be remembered that the sleeve or holding lead S for each link is threaded through the core corresponding to this link so that when the link is in use, the holding current flowing through the sleeve lead biases the core into its binary "0" state and prevents its switching into the other binary "1" state.

The interrogate control 160 and electronic scanner 165 are then actuated by the application of suitable clock pulses thereto from common control equipment such that a negative going interrogate pulse is applied successively to each of the scan points 401 through 580. The negative going interrogate pulse travels in both directions through the matrix network along the unique path associated therewith and during this traverse of the network the pulse will switch all cores along the path which are associated with an idle link of the network but will have no effect upon those cores associated with a link already forming part of a busy line circuit. Thus, if one link of the path is busy, the core coupled to the link will not be switched indicating that the path in that particular stage of the network is busy.

As soon as a core is switched by the interrogate pulse, the switching function will be detected by the read winding associated with that group of cores in a given stage of the network. For example, if the path associated with the scan point 410 between the marked line circuit 100 and the marked output junctor 850 is idle, the passage of the interrogate pulse through magnetic core 286 will induce an impulse in the read winding 290 which will be amplified by amplifier 295 and applied to AND gate 900. The interrogate pulse will also induce an output in read winding 190 due to its switching of the core 188 on its way to matrix group 110 it line circuit 100. The output in read winding 190 will be amplified by amplifier 195 and applied also to the AND gate 900. In its passage from the scan point 410 toward the output junctor 850, the interrogate pulse will switch magnetic core 584 including an output pulse in the read winding 590 associated with this core, which output pulse will be amplified in amplifier 595 and applied to AND gate 900.

Coincidence of output signals from each of the three groups of cores as detected by AND gate 900, will produce a "stop scan" output signal. This "stop scan" output signal is applied to interrogate control 160 and electronic scanner 165 to stop the electronic scanner from advancing to the next scan point and to switch the interrogate control 160 so as to effect application of direct current to the path for a sufficient duration to insure operation of all of the cross point relays in the path, which relays in turn will lock, by means of their holding windings, as indicated in connection with FIGURE 1.

Thus, with the unique path arrangement of the present invention it is unnecessary to test each link of the network and determine how the free links may be combined to produce a free path. It is also unnecessary with the present invention even after a free path has been detected to determine the actual links involved since the path is simply identified by the unique scan point associated therewith.

Figure 3:
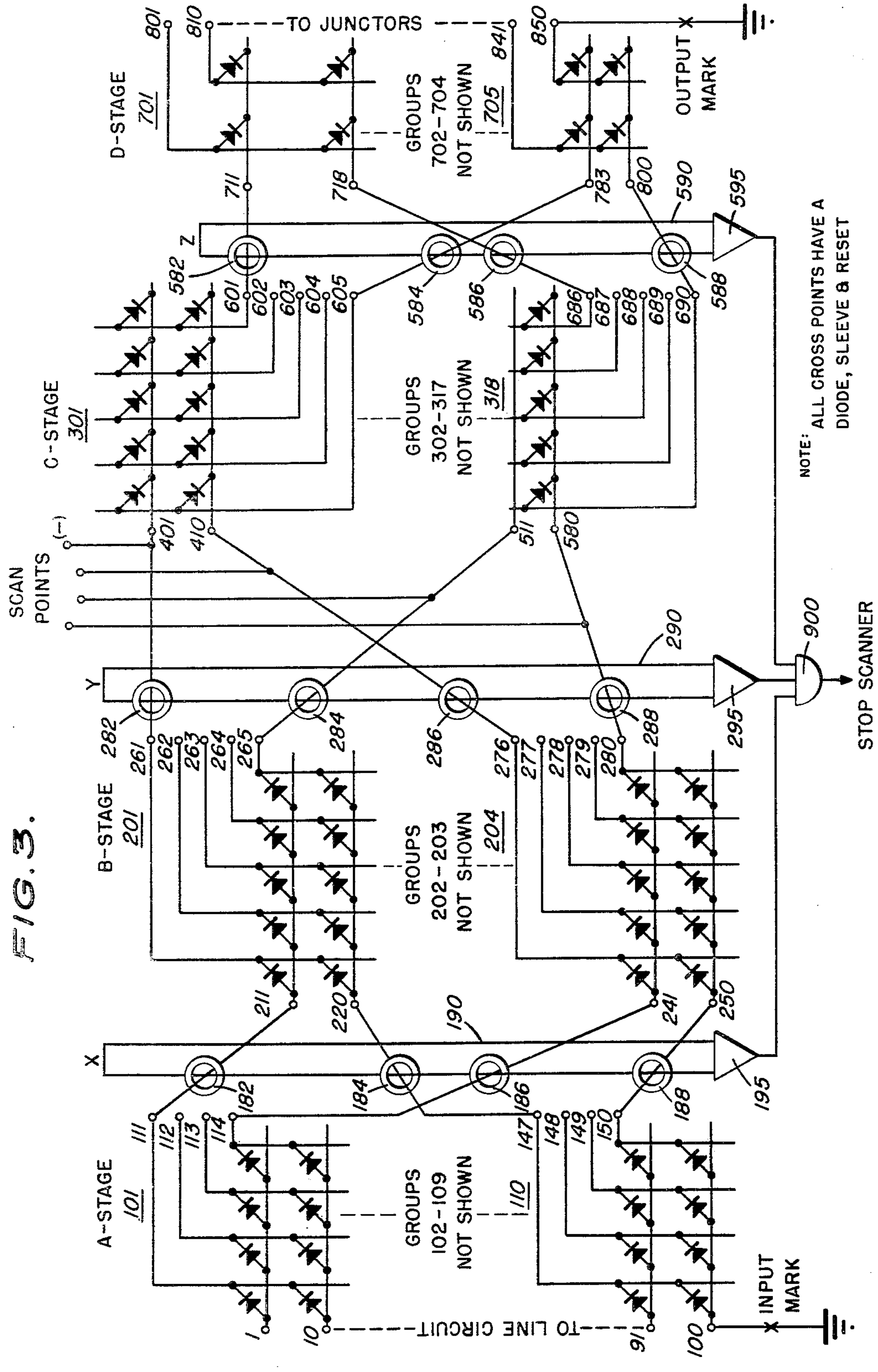
FIGURE 3 is a more detailed circuit diagram of the arrangement illustrated in FIGURE 2, showing the interconnection between the cross point groups of each of the stages of the network.

Referring now to FIGURE 3, which illustrates a practical embodiment of the network of FIGURE 2, stage A of the network includes ten matrix groups 101 through 110, groups 102 through 109 not specifically illustrated, with each matrix group having ten inputs connected to corresponding line circuits and four outputs so that a total of 40 outputs 111 through 150 are provided from this first stage of the network.

Stage B of the network includes four matrix groups 201 through 204, groups 202 and 203 not specifically shown, with each group once again providing 10 inputs so that a total of 40 inputs 211 through 250 are provided to this stage. Interconnection is then effected between stage A and stage B with the four outputs of the first matrix group 101 in stage A being connected to the first input of each of the four matrix groups 201 through 204 in stage B. The remaining matrix groups 102 through 110 of stage A, in likt manner, have their four outputs connected to the corresponding input line of each of the four groups 201 through 204 in stage B. It is noted that while only cores 182, 184, 186 and 188 are illustrated in connection with the four links interconnecting stages A and B in FIG. 3, in accordance with the principles of the present invention, each of the links interconnecting the outputs of stage A and the inputs of stage B are coupled to a separate core associated with the common read winding 190.

Figure 4:
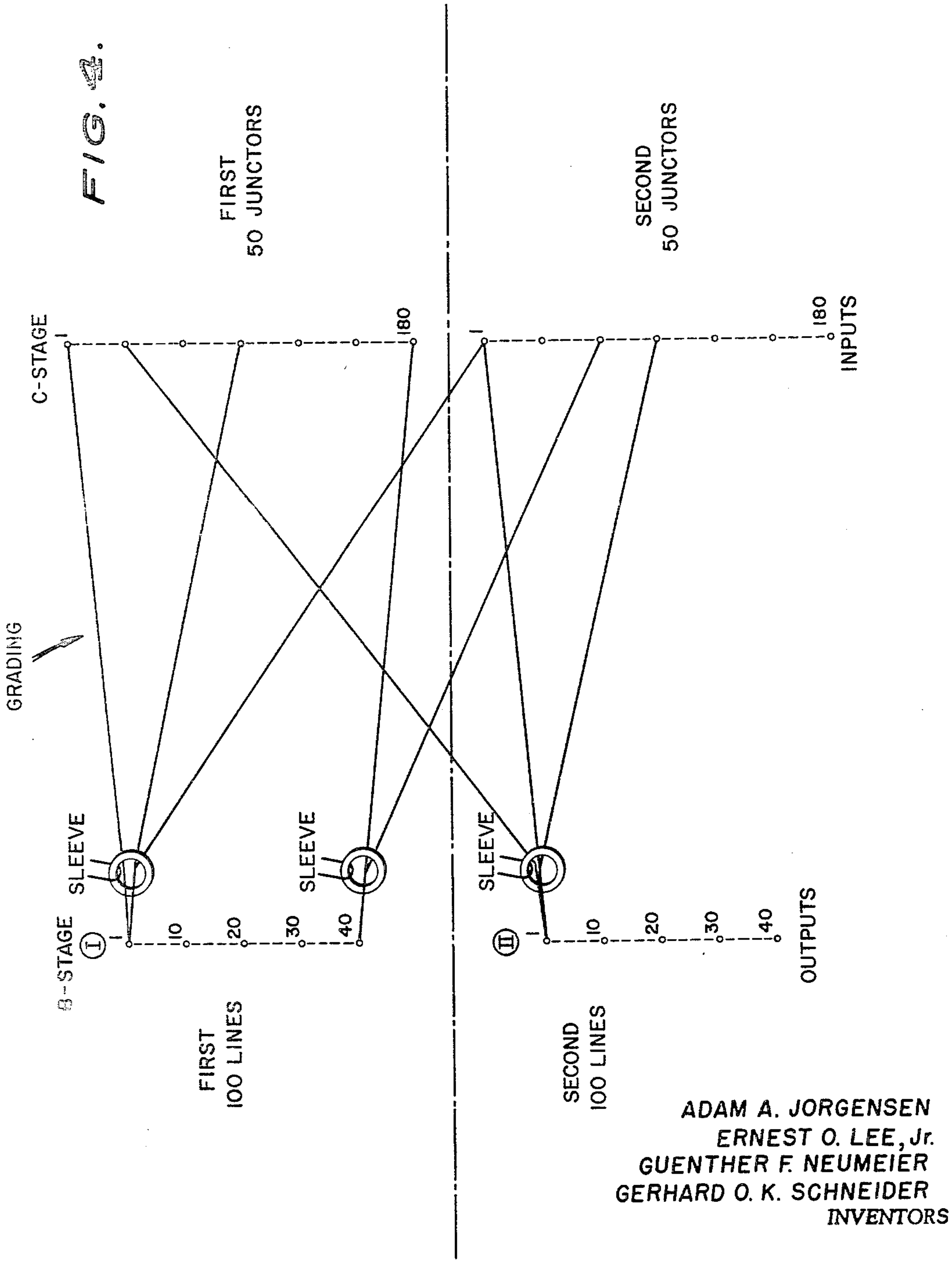
FIGURE 4 is a schematic diagram of an exemplary grading pattern which may be used in conjunction with the arrangement of the present invention.

The matrix groups in stage B are each provided with five outputs so that a total of 20 outputs 261 through 280 are available. Stage C is provided with 18 matrix groups 301 through 318, groups 302 through 317 not specifically illustrated, with each matrix group one again having 10 input lines so that a total of 180 input lines 401 through 580 are provided to this stage. It is noted at this time that in contrast to the arrangement between sages A and B, there are approximately nine times as many inputs to stage C as outputs to stage B. This grading between stages B and C provides for a multiplicity of paths from input to output through the network which allows the provision of circuits on a traffic basis and also permits an interdigitation of lines from other networks, such as illustrated in FIGURE 4.

The matrix groups 301 through 318 in stage C of the network each provide five outputs so that a total of ninety outputs 601 through 690 are available from stage C of the network. Five matrix groups 701 through 705 are provided in stage D, groups 702 through 704 not specifically shown, with each of the groups providing eighteen inputs so that a total of ninety inputs 711 through 800 are available for connection to the corresponding ninety outputs from stage C of the network. Once again the outputs from group 301 of stage C are applied to each first input of the groups 701 through 705 in stage D and the remaining groups 302 through 318 are connected in a similar manner to the corresponding position in each of the groups in the D stage. The groups in the D stage each provide ten outputs so that a total of 50 outputs 801 through 850 are available for connection to output junctors.

Each of the links between stages B and C of the network are provided with a switchable core in spite of the fact that FIGURE 3 illustrates only four cores 282, 284, 286 and 288 associated with the common read winding 290. This is also true of the links between stages C and D, each of which are provided with a magnetic core in spite of the illustration of only cores 582, 584, 586 and 588 associated with the common read winding 590.

As in the case of the simplified network illustrated in FIGURE 2, scan points are provided in connection with each of the 180 links between stages B and C of the network in FIGURE 3 since these scan points each connect to a unique path through the network. That the scan points must be located between stages B and C of the network to find access to unique paths through the network can easily be seen from FIGURE 3. For example, if the scan points were provided at the output of the D stage, such as output 850, which represents the marked output in the illustrated example, it is seen that a multiplicity of paths exist from this point to the input marking at input 100 in stage A. The paths exist from output 850 through the matrix 705 to any one of the inputs 783 through 800 thereof, which inputs are connected to each of the matrix groups 301 through 318 in stage C. From any of the groups 391 through 318 at least one path extends through a matrix group 201 through 204 in stage B which had access to the matrix group 110 in stage A. Thus a large number of paths exists from the output mark at output 850 of matrix group 705 to the input mark at input 100 of the matrix group 110.

On the other hand, from a scan point, such as scan point 580, the path to the input mark at input 100 of matrix group 110 must pass through core 288 to output 280 of group 204 and through this matrix group from input 250 through core 188 to output 150 of matrix group 110. From output 150 of the matrix group 110 only one path exists to the input mark at input 100. In the other direction from scan point 580, a unique path exists through the matrix group 318 from the input 580 thereof to the output 690. From output 690 the path extends through core 588 to input 800 of the matrix group 705 from which point there is a single path through to output 850 of the matrix group containing the output mark. Thus, by providing the scan points at the proper location in the matrix network unique paths are provided which eliminate any need for specifically identifying the busy-free condition of a particular link between stages of the matrix and makes possible the monitoring of passage of an interrogate pulse through an entire group without specific knowledge of the particular link through which the pulse is traveling.

As a result of the disclosed arrangement, a very simple and reliable control arrangement can be provided in accordance with the present invention which merely monitors the passage of an interrogate pulse along a unique path through successive stages of the matrix and upon detection of the passage of this pulse from the scan point in both directions to the input and output mark terminals, a control signal can be generated to remember or hold the scan point associated with the free path and suitable supervisory equipment can be controlled to apply a signal of sufficient length to the free path to operate each of the relays in the matrix groups associated therewith establishing a connection between input and output mark terminals.

In case no idle path is found after minitoring of all of the scan points available in the network, the marker arrangement can, on originating calls, drop the original output marking point and select a different one. For example, if it appears after monitoring all the scan points that all paths from a given input mark to a particular selected output junctor are busy, then the supervisory equipment can select another free output junction through which to extend the call thereby once again opening up the possibility of obtaining a free line through the matrix network. With the new output mark selected, scanning of the unique paths in the network can be initiated once again and this procedure may be continued until a free path is found. This method provides almost full availability in the network and effectively provides a relay matrix having an artificial zero position, or for that matter, one which is programmed to vary the position from which hunting commences for every attempt.

While we have shown and described several embodiments in accordance with the instant invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. In a telephone communication system, a crosspoint switching matrix including a plurality of input lines disposed with respect to a plurality of output lines to form a plurality of crosspoints and a relay associated with each crosspoint having its contacts interconnecting the input and output lines forming the respective crosspoint, each of said input and output lines having an associated input or output control line, each relay having an operate winding interconnecting the control lines associated with the input and output lines forming the respective crosspoint, circuit means for establishing a communication connection along selected paths through said switching matrix from an input line to an output line, detecting means having first and second states and coupled to each output control line for detecting the passage of a signal through said control line only in the first state thereof, holding means coupling said detecting means to each of the group of input lines forming a crosspoint with the output line associated therewith for switching said detecting means to its second state in response to the establishment of a communication connection in any one of said group of input lines, and signal means for applying a signal to each output control line in sequence.

2. The combination defined in claim 1 wherein said detecting means includes a plurality of magnetic cores each associated with an output control line and a sense winding coupled to all of said cores.

3. The combination defined in claim 2 wherein said holding means includes an individual circuit connected to a respective input line at a crosspoint thereof to a source of potential and being coupled to the magnetic core associated with the output control line forming a crosspoint with the input control line associated with said respective input line, each individual circuit including contact and an operate winding of the relay associated with the crosspoint.

4. The combination defined in claim 3 further including control means responsive to the detection of a signal applied from said signal means by one of said cores for stopping the sequencing of said signal means.

5. The combination defined in claim 4 wherein said signal means includes pulse generating means for generating of pulse of short duration incapable of permanently operating said relays during sequencing thereof and for generating a signal of sufficient duration to permanently operate said relays in response to stoppage of said sequencing by said control means.

6. A matrix of crosspoint switching groups arranged in a plurality of consecutive stages and having a plurality of inputs and a plurality of outputs and a plurality of paths from each input through selected switching groups to each output, circuit means for establishing a communication connection via selected lines associated with paths through said matrix, detecting means having first and second states and coupled along each path between each of said switching groups for detecting passage of a signal therethrough between stages of the matrix only in the first state thereof, interrogate means sequentially coupled between adjacent stages within said matrix to a plurality of scan points from each of which a unique path extends to each input and each output through said switching groups for applying an interrogate signal thereto, and means associated with each detecting means for switching said detecting means to its second state in response to association of the path coupled thereto with a communication connection.

7. The combination defined in claim 6 wherein said detecting means includes a magnetic core coupled to each link between switching groups forming part of one or more paths through the matrix.

8. The combination defined in claim 7 wherein said detecting means further includes a sense winding common to each group of cores associated with all of the links between respective adjacent stages of the matrix to detect passage of a pulse on a path between said respective stages, and an AND gate connected to all of said sense windings.

9. The combination defined in claim 8 wherein said interrogate means includes an interrogate control and a scanner for sequentially connecting said interrogate control to said scan points, said scanner being responsive to the output of said AND gate for holding said interrogate control in contact with one scan point.

10. The combination defined in claim 9 wherein said interrogate control generates upon connection to each scan point a pulse of short duration incapable of permanently operating the crosspoint switching groups in the path connected thereto and is responsive to the output of said AND gate for generating a pulse of long duration to operate said crosspoint switching groups in the path connected thereto.

11. The combination defined in claim 10 wherein said circuit means includes a telephone subscriber line circuit connected to an input line associated with each input of the matrix and an output junctor connected to an output line associated with each output thereof, said input lines and output lines forming a matrix of cross points interconnected by relays controlled from said cross-point switching groups.

12. In combination with a matrix of crosspoint switching groups arranged in a plurality of consecutive stages and having a plurality of inputs and a plurality of outputs and a plurality of paths from each input through selected switching groups to each output, and means for establishing a communication connection via selected communication lines associated with selected paths through said matrix, the improvement essentially consisting of means for determining a free path from a given input to a given output having no portion thereof associated with a communication connection comprising detecting means coupled along each path between each of said switching groups for detecting the passage of a signal therethrough between stages of the matrix, interrogate means sequentially coupled to a plurality of scan points between adjacent stages in said matrix intermediate said plurality of inputs and plurality of outputs, from each of which scan points a unique path extends through said switching groups to a given input and a given output, said interrogate means including pulse generating means and scanning means for connecting said pulse generating means sequentially to said scan points, and control means for detecting the passage of a pulse applied to a scan point through each stage of said matrix from a given input to a given output.

13. The combination defined in claim 12 wherein said detecting means is in the form of magnetic cores switchable between first and second magnetic states, said cores being coupled to respective communication lines so as to be switched to and held in their second magnetic state upon establishment of a communication connection through the portion of the line associated therewith.

14. The combination defined in claim 13, wherein said detecting means further includes a sense winding common to each group of cores associated with all of the links between respective adjacent stages of the matrix to detect passage of a pulse on a path between said respective stages, and an AND gate connected to all of said sense windings.

15. The combination defined in claim 14, wherein said interrogate means includes an interrogate control and a scanner for sequentially connecting said interrogate control to said scan points, said scanner being responsive to the output of said AND gate for holding said interrogate control in contact with one scan point.

16. The combinaion defined in claim 15, wherein said interrogate control generates upon connection to each scan point a pulse of short duration incapable of permanently operating the crosspoint switching groups in the path connected thereto and is responsive to the output of said AND gate for generating a pulse of long duration to operate said crosspoint switching groups in the path connected thereto.

17. The combination defined in claim 16 wherein said crosspoint switching groups each include a plurality of input communication lines and a plurality of output communication lines in matrix configuration forming a plurality of crosspoint and a relay associated with each crosspoint having its contact interconnecting the input and output communication lines at the respective crosspoint.

18. The combination defined in claim 17 wherein each crosspoint switching group further includes a plurality of input control lines and output control lines in matrix configuration forming a plurality of crosspoints and associated with respective input or output communication lines, each relay having an operate winding interconnecting the control lines forming a crosspoint corresponding to the crosspoint interconnected by the relay contacts.

19. The combination defined in claim 18 further including holding means coupling said cores to respective input communication lines in an associated switching group for holding said cores associated with lines forming part of a communication connection in their second magnetic state, each including an operate winding of the relay associated with a respective crosspoint and additional contacts of the relay connected in series.

20. The combination defined in claim 19 wherein the means for establishing a communication connection include a telephone line circuit connected to each input of the matrix and an output junctor connected to each output thereof.

References Cited

UNITED STATES PATENTS

| | | | |
|---|---|---|---|
| 3,238,306 | 3/1966 | Bohlmeijer | 179—18 |
| 3,311,708 | 3/1967 | de Kroes | 179—18 |
| 3,349,189 | 10/1967 | Van Bosse | 179—18 |

KATHLEEN H. CLAFFY, Primary Examiner

W. A. HELVESTINE, Assistant Examiner